United States Patent

Guarda et al.

(10) Patent No.: US 10,351,669 B2
(45) Date of Patent: Jul. 16, 2019

(54) AMINO DERIVATIVES OF PERFLUOROPOLYETHERS

(71) Applicant: SOLVAY SPECIALTY POLYMERS ITALY S.P.A., Bollate (IT)

(72) Inventors: Pier Antonio Guarda, Arese (IT); Rosaldo Picozzi, Cesate (IT); Giovanni Simeone, Solaro (IT)

(73) Assignee: SOLVAY SPECIALTY POLYMERS ITALY S.P.A., Bollate (MI) (IT)

( * ) Notice: Subject to any disclaimer, the term of this patent is extended or adjusted under 35 U.S.C. 154(b) by 62 days.

(21) Appl. No.: 15/528,016

(22) PCT Filed: Nov. 16, 2015

(86) PCT No.: PCT/EP2015/076689
§ 371 (c)(1),
(2) Date: May 18, 2017

(87) PCT Pub. No.: WO2016/079053
PCT Pub. Date: May 26, 2016

(65) Prior Publication Data
US 2018/0346644 A1 Dec. 6, 2018

(30) Foreign Application Priority Data

Nov. 19, 2014 (EP) .................................... 14193944

(51) Int. Cl.
C08G 65/00 (2006.01)
C08G 65/333 (2006.01)
C08G 65/331 (2006.01)
C08G 65/337 (2006.01)
C08L 71/00 (2006.01)
C08G 18/18 (2006.01)
C08G 59/50 (2006.01)

(52) U.S. Cl.
CPC ... *C08G 65/33396* (2013.01); *C08G 18/1883* (2013.01); *C08G 59/504* (2013.01); *C08G 65/007* (2013.01); *C08G 65/337* (2013.01); *C08G 65/3312* (2013.01); *C08G 65/33306* (2013.01); *C08L 71/00* (2013.01)

(58) Field of Classification Search
CPC .................................................... C08G 65/007
See application file for complete search history.

(56) References Cited

U.S. PATENT DOCUMENTS

| 4,681,693 | A | 7/1987 | Gavezotti et al. |
| 6,083,600 | A | 7/2000 | Kasai et al. |
| 6,984,759 | B2 | 1/2006 | Di Meo et al. |
| 2005/0096244 | A1 | 5/2005 | Audenaert et al. |
| 2010/0197869 | A1* | 8/2010 | Tonelli ................. C08G 63/672 525/420 |
| 2011/0015107 | A1 | 1/2011 | Marchionni et al. |
| 2012/0190603 | A1 | 7/2012 | Shirakawa et al. |
| 2015/0321984 | A1* | 11/2015 | Tonelli ................. C08G 65/007 508/582 |

FOREIGN PATENT DOCUMENTS

| EP | 0249048 | A2 | 12/1987 |
| EP | 0556770 | A1 | 8/1993 |
| EP | 1479753 | A2 | 11/2004 |
| EP | 1614703 | A1 | 1/2006 |
| EP | 1810987 | A1 | 7/2007 |
| WO | 2009043928 | A1 | 4/2009 |
| WO | 2013092632 | A1 | 6/2013 |
| WO | WO-2013092632 | A1 * | 6/2013 ........... C08G 65/007 |
| WO | 2014090649 | A1 | 6/2014 |

* cited by examiner

*Primary Examiner* — Michael M Dollinger
*Assistant Examiner* — Christina H. W. Rosebach

(57) ABSTRACT

The present invention relates to (per)fluoropolyether (PFPE) amino derivatives, a method for their manufacturing and their uses.

15 Claims, No Drawings

AMINO DERIVATIVES OF PERFLUOROPOLYETHERS

CROSS REFERENCE TO RELATED APPLICATIONS

This application is a U.S. national stage entry under 35 U.S.C. § 371 of International Application No. PCT/EP2015/076689 filed Nov. 16, 2015, which claims priority to European application No. 14193944.7 filed on Nov. 19, 2014. The entire contents of these applications are explicitly incorporated herein by this reference.

TECHNICAL FIELD

The present invention relates to amino derivatives of perfluoropolyether polymers, a method for their manufacturing and their uses.

BACKGROUND ART

Perfluoropolyethers (PFPE) polymers comprising amino groups at their chain ends (hereinafter "PFPE-amino") are potentially interesting materials from the industrial perspective.

PFPE-amino and methods for their production are known in the art. For example U.S. Pat. No. 6,083,600 (INTERNATIONAL BUSINESS MACHINES CORPORATION) discloses PFPE wherein the polymer backbone is terminated with at least one amine end group, which is linked to the polymer backbone through a methylene bridging group. U.S. Pat. No. 6,984,759 (SOLVAY SOLEXIS S.P.A.) discloses a method for the preparation of PFPE comprising primary amino groups at its chain ends, wherein the amino groups are linked to the PFPE chain through a methylene bridging group.

However, when amino groups are directly linked to the PFPE chain, said amino groups have poor basic properties. As a consequence, the resulting PFPE-amino derivatives are poorly reactive and of little use both as intermediates for the synthesis of polymers and as additives, for example in coating compositions.

Also, the synthesis known in the art are not convenient on industrial scale, as they require several steps of chain ends modification under tricky and expensive reaction conditions.

WO 2013/092632 (SOLVAY SPECIALTY POLYMERS ITALY S.P.A) discloses (per)fluoropolyether compounds having two chain ends, wherein one or both chain ends is a —CF2-group covalently bound to an optionally substituted aromatic or heteroaromatic group through a -carbon-carbon-bond.

EP 0249048 (AUSIMONT S.P.A.) discloses cross-linking of epoxy resins by means of polyfunctional perfluoropolyethers containing groups which are reactive with the epoxy groups and/or with the hydroxy groups present in the starting resin.

SUMMARY OF INVENTION

The Applicant perceived that there is still the need to provide novel PFPE polymer derivatives comprising amino groups, wherein the amino groups retain their basic properties, so that the polymer is reactive, and which are accessible through effective synthetic pathways suitable for industrial implementation.

Thus, in a first aspect, the present invention relates to a polymer [polymer (P)] comprising:

at least one aromatic moiety [moiety (A)] optionally substituted with at least one halogen atom,
at least one (per)fluoropolyether chain [chain $(R_{pf})$] linked to said moiety (A), and
at least one amino group [group (N)] linked to said moiety (A).

The Applicant has surprisingly found that in polymer (P) according to the present invention, the basicity of said amino group is retained.

Advantageously, when said amino group is a primary or secondary amino group, polymer (P) according to the present invention is reactive and, hence, it is useful as reactive additive for different types of resins and, also, as intermediate or building block in the synthesis of further polymers.

Advantageously, when said amino group is a tertiary amino group, polymer (P) according to the present invention is useful as intermediate compound in the synthesis of polymers comprising quaternary ammonium salt(s) or zwitterionic group(s).

Then, in a second aspect, the present invention relates to a method for manufacturing polymer (P), which comprises the following steps:

(a) reacting at least one (per)fluoropolyether-alcohol [PFPE-alcohol] with an aromatic compound [compound (A)] substituted with at least two halogen atoms, and (b) reacting the compound obtained in step (a) with a compound [compound (AN)] comprising at least one amino group [group (N*)] and at least one nucleophilic group [group (U)].

The Applicant surprisingly found that the use of compound (A) allows providing an easy process for the manufacturing of polymer (P) that is more effective and straightforward when compared to those known in the art, and which is hence compatible with an industrial implementation.

DETAILED DESCRIPTION OF THE INVENTION

For the purpose of the present description and of the following claims:

the use of parentheses around symbols or numbers identifying the formulae, for example in expressions like "polymer (P)", "chain $(R_{pf})$", etc., has the mere purpose of better distinguishing the symbol or number from the rest of the text and, hence, said parenthesis can also be omitted;

the acronym "PFPE" stands for "(per)fluoropolyether" and, when used as substantive, is intended to mean either the singular or the plural from, depending on the context. The prefix "(per)" in the term "(per)fluoropolyether" means that the polyether can be fully or partially fluorinated;

the term "functionality" referred to polymer (P) or to the PFPE-alcohol indicates the average number of functional groups, i.e. groups (N) or groups —OH, per polymer molecule and can be calculated for example as disclosed in EP 1810987 A (SOLVAY SOLEXIS S.P.A.);

the expression "zwitterionic group" (also referred to as "inner salt") indicates a neutral molecule bearing a positive charge and a negative charge in the same molecule, in other words molecules that are electrically neutral overall but contain nonadjacent regions of positive and negative charges linked via covalent bonds;

the expression "aromatic moiety [moiety (A)]" indicates any cyclic ring derived from an aromatic compound;

the expression "aromatic compound" indicates any cyclic compound having a number of π electrons equal to 4n+2, wherein n is 0 or any positive integer;

the expression "alkylenyl chain" indicates a divalent linear or branched saturated or unsaturated aliphatic chain, preferably comprising from 1 to 20 carbon atoms.

Preferably, said moiety (A) is a 5- to 10-membered aromatic ring, optionally comprising at least one heteroatom and/or optionally being bounded to or condensed with one or more further aromatic rings.

In a preferred embodiment, in said moiety (A), at least one, more preferably at least two, and even more preferably all the carbon atoms which do not bear chain ($R_{pf}$) and group (N) [with the exception of bridging carbon atoms if moiety (A) is a polycyclic or polycondensed aromatic moiety] bear halogen atoms.

Preferably, said halogen atoms are independently selected from fluorine, chlorine and bromine; more preferably, all halogen atoms are fluorine atoms.

More preferably, said moiety (A) is a selected from fluorinated benzene, fluorinated naphthalene, fluorinated biphenyl and fluorinated pyridine. Still more preferably, said moiety (A) is selected from fully fluorinated benzene and fully fluorinated pyridine.

In a preferred embodiment, said chain ($R_{pf}$) is of formula —O—$R_f$—, wherein: —$R_f$ is a fully or partially fluorinated polyoxyalkylene chain [chain ($R_f$)] that comprises, preferably consists of, repeating units R°, said repeating units being independently selected from the group consisting of:
(i) —CFXO—, wherein X is F or $CF_3$;
(ii) —CFXCFXO—, wherein X, equal or different at each occurrence, is F or $CF_3$, with the proviso that at least one of X is —F;
(iii) —$CF_2CF_2CW_2O$—, wherein each of W, equal or different from each other, are F, Cl, H;
(iv) —$CF_2CF_2CF_2CF_2O$—;
(v) —$(CF_2)_j$—CFZ—O— wherein j is an integer from 0 to 3 and Z is a group of general formula —O—$R_{(f-a)}$-T, wherein $R_{(f-a)}$ is a fluoropolyoxyalkene chain comprising a number of repeating units from 0 to 10, said recurring units being chosen among the followings: —CFXO—, —$CF_2CFXO$—, —$CF_2CF_2CF_2O$—, —$CF_2CF_2CF_2CF_2O$—, with each of each of X being independently F or $CF_3$ and T being a $C_1$-$C_3$ perfluoroalkyl group.

Preferably, chain ($R_f$) complies with the following formula:

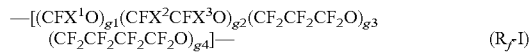
—[(CFX$^1$O)$_{g1}$(CFX$^2$CFX$^3$O)$_{g2}$(CF$_2$CF$_2$CF$_2$O)$_{g3}$ (CF$_2$CF$_2$CF$_2$CF$_2$O)$_{g4}$]—      ($R_f$-I)

wherein
$X^1$ is independently selected from —F and —$CF_3$,
$X^2$, $X^3$, equal or different from each other and at each occurrence, are independently —F, —$CF_3$, with the proviso that at least one of X is —F;
g1, g2, g3, and g4, equal or different from each other, are independently integers ≥0, such that g1+g2+g3+g4 is in the range from 2 to 300, preferably from 2 to 100; should at least two of g1, g2, g3 and g4 be different from zero, the different recurring units are generally statistically distributed along the chain.

More preferably, chain ($R_f$) is selected from chains of formula:

—[(CF$_2$CF$_2$O)$_{a1}$(CF$_2$O)$_{a2}$]—      ($R_f$-IIA)

wherein:
a1 and a2 are independently integers ≥0 such that the number average molecular weight is between 400 and 10,000, preferably between 400 and 5,000; both a1 and a2 are preferably different from zero, with the ratio a1/a2 being preferably comprised between 0.1 and 10;

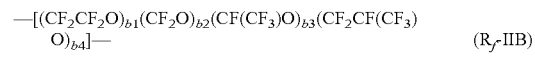
—[(CF$_2$CF$_2$O)$_{b1}$(CF$_2$O)$_{b2}$(CF(CF$_3$)O)$_{b3}$(CF$_2$CF(CF$_3$) O)$_{b4}$]—      ($R_f$-IIB)

wherein:
b1, b2, b3, b4, are independently integers ≥0 such that the number average molecular weight is between 400 and 10,000, preferably between 400 and 5,000; preferably b1 is 0, b2, b3, b4 are >0, with the ratio b4/(b2+b3) being ≥1;

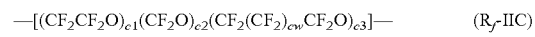
—[(CF$_2$CF$_2$O)$_{c1}$(CF$_2$O)$_{c2}$(CF$_2$(CF$_2$)$_{cw}$CF$_2$O)$_{c3}$]—      ($R_f$-IIC)

wherein:
cw=1 or 2;
c1, c2, and c3 are independently integers ≥0 chosen so that the number average molecular weight is between 400 and 10,000, preferably between 400 and 5,000; preferably c1, c2 and c3 are all >0, with the ratio c3/(c1+c2) being generally lower than 0.2;

—[(CF$_2$CF(CF$_3$)O)$_d$]—      ($R_f$-IID)

wherein:
d is an integer >0 such that the number average molecular weight is between 400 and 10,000, preferably between 400 and 5,000;

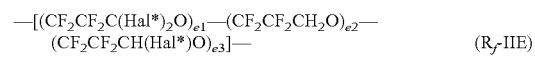
—[(CF$_2$CF$_2$C(Hal*)$_2$O)$_{e1}$—(CF$_2$CF$_2$CH$_2$O)$_{e2}$— (CF$_2$CF$_2$CH(Hal*)O)$_{e3}$]—      ($R_f$-IIE)

wherein:
Hal*, equal or different at each occurrence, is a halogen selected from fluorine and chlorine atoms, preferably a fluorine atom;
e1, e2, and e3, equal to or different from each other, are independently integers ≥0 such that the (e1, +e2+e3) sum is comprised between 2 and 300.

Still more preferably, chain ($R_f$) complies with formula ($R_f$-III) here below:

—[(CF$_2$CF$_2$O)$_{a1}$(CF$_2$O)$_{a2}$]—      ($R_f$-III)

wherein:
a1, and a2 are integers >0 such that the number average molecular weight is between 400 and 10,000, preferably between 400 and 5,000, with the ratio a2/a1 being generally comprised between 0.1 and 10, more preferably between 0.2 and 5.

Preferably, said group (N) is a primary, secondary or tertiary amino group.

More preferably, said group (N) complies with the following formula (N-I):

—N(R$_1$)(R$_2$)      (N-I)

wherein
$R_1$ and $R_2$, identical or different each other, are a hydrogen atom, a linear or branched saturated or unsaturated alkyl chain having from 1 to 10 carbon atoms, a 3- to 6-membered saturated or unsaturated ring optionally comprising at least one heteroatom; or $R_1$ and $R_2$ together with the nitrogen atom form a cyclic ring comprising from 3 to 6 carbon atoms.

Preferably, $R_1$ and $R_2$, identical or different each other, are a hydrogen atom, a linear or branched alkyl chain having from 1 to 6 carbon atoms or a 5- or 6-membered unsaturated ring optionally comprising at least one heteroatom. More preferably, $R_1$ and $R_2$, identical or different each other, are a hydrogen atom, a linear or branched alkyl chain having from 1 to 3 carbon atoms or a phenyl ring. Still more preferably, $R_1$ and $R_2$, identical or different each other, are a hydrogen atom or a linear or branched alkyl chain having from 1 to 3 carbon atoms.

In a preferred embodiment, said chain ($R_f$) is linked to said moiety (A) through an alkylenyl chain [chain (B)] comprising from 1 to 20 carbon atoms and at least one heteroatom directly bonded to said moiety (A).

Preferably, said chain (B) is an alkylenyl chain comprising from 1 to 20, more preferably from 1 to 12, carbon atoms and at least one heteroatom selected from O, S and NH directly bonded to said moiety (A), wherein said chain is optionally fluorinated and/or optionally substituted with one or more hydroxyl group and/or optionally interrupted by at least one heteroatom selected from O, S and NH.

More preferably, said chain (B) is an alkylenyl chain comprising from 1 to 6 carbon atoms and an oxygen atom directly bonded to said moiety (A), wherein said chain is optionally fluorinated and/or optionally interrupted by at least one oxygen atom.

Still more preferably, said chain (B) complies with the following general formula (B-I) to (B-V):

—CFXCH$_2$O(CH$_2$CH$_2$O)$_r$—    (B-I)

—CFXCH$_2$O(CH$_2$CH(CH$_3$)O)$_r$—    (B-II)

—CF$_2$CF$_2$CH$_2$O(CH$_2$CH$_2$O)$_r$—    (B-III)

—CFXCH$_2$O(CH$_2$CHOHCH$_2$O)$_{r'}$—    (B-IV)

—CF$_2$CF$_2$CH$_2$O(CH$_2$CHOHCH$_2$O)$_{r'}$—    (B-V)

wherein
X is F or —CF$_3$,
r is an integer from 0 to 10, preferably from 0 to 7,
r' is an integer from 1 to 3,
and the oxygen atom at the end of the chain is directly bonded to said moiety (A).

In a preferred embodiment, said chain (B) complies with formula (B-I) as defined above, wherein r is 0.

As disclosed above, the direction of chain (B) is such that the oxygen atom at the end of the chain is directly bonded to moiety (A) and the (halo)alkyl group at the other end of chain is bonded to chain ($R_f$), for example as follows:
($R_{pf}$)—CFXCH$_2$O—(CH$_2$CH$_2$O)$_r$—(A)    or
(A)—(OCH$_2$CH$_2$)$_r$—OCH$_2$CFX—($R_{pf}$).

In a preferred embodiment, said group (N) is linked to said moiety (A) through an alkylenyl bridging group [group ($R_H$)] comprising from 1 to 12 carbon atoms and at least one heteroatom directly bonded to said moiety (A).

Preferably, said group ($R_H$) is an alkylenyl chain comprising from 1 to 8 carbon atoms and at least one heteroatom selected from O, S and NH directly bonded to said moiety (A), wherein said alkylenyl chain is optionally substituted with at least one hydroxy group and/or optionally interrupted by at least one heteroatom selected from O, S and NH; or a 5- or 6-membered aromatic moiety substituted with at least one group comprising an heteroatom selected from O, S and NH.

More preferably, said group ($R_H$) is an alkylenyl chain comprising from 1 to 6 carbon atoms and at least one oxygen atom directly bonded to said moiety (A), wherein said alkylenyl chain is optionally interrupted by at least one oxygen atom.

Still more preferably, said group ($R_H$) complies with the following general formula ($R_H$-I):

—(O—CH$_2$CH$_2$)$_q$—    ($R_H$-I)

wherein q is an integer from 1 to 3.

In one embodiment, polymer (P) according to the present invention comprises at least two moieties (A) bonded to opposite ends of one chain ($R_f$), wherein each of said moieties (A) is further substituted with at least one group (N).

In an alternative embodiment, polymer (P) according to the present invention comprises at least one moiety (A) bonded to two chains ($R_f$), wherein said at least one moiety (A) is further substituted with at least one group (N).

Advantageously, moiety (A) acts as a spacer between groups (N) and chain ($R_{pf}$), such that groups (N) are less affected by the electronegativity of fluorine atoms in chain ($R_{pf}$) and, hence, the resulting polymer (P) is reactive, as explained in more detail below.

Preferably, polymer (P) according to the present invention complies with the following general formulae (P-I), (P-II), (P-III) or (P-IV):

(P-I)

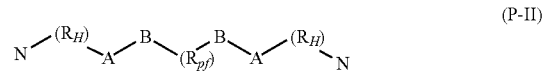
(P-II)

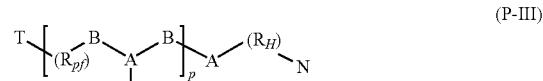
(P-III)

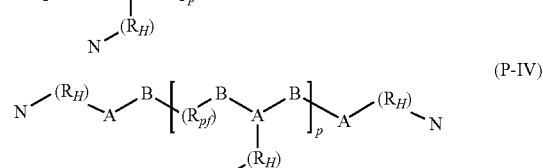
(P-IV)

wherein
T is hydrogen atom or a neutral group selected from —CF$_2$H, —CF$_2$CF$_2$H, —CF$_3$, —CF$_2$CF$_3$, —CF$_2$Cl, —CF$_2$CF$_2$Cl, —C$_3$F$_6$Cl and —CF$_2$Br;
p is an integer >0, preferably from 1 to 10; and
($R_{pf}$), A, B, ($R_H$) and N are as defined above.

Preferably, chain ($R_{pf}$) is —O—$R_f$—, wherein chain ($R_f$) complies with formula ($R_f$-I) as defined above. More preferably, chain ($R_f$) complies with formula ($R_f$-IIA), ($R_f$-IIB), ($R_f$-IIC), ($R_f$-IID) or ($R_f$-IIE) as defined above. Still more preferably, chain ($R_f$) complies with formula ($R_f$-III) as defined above.

More preferably, polymer (P) according to the present invention is bifunctional, i.e. complies with general formula (P-II) or (P-IV) as defined above.

Preferably, the functionality of polymer (P), i.e. the average number of groups (N) per molecule of polymer (P), is from 1 to 10, more preferably from 1 to 5 and even more preferably from 1 to 3.

Method for Manufacturing Polymer (P)

Advantageously, the method for preparing polymer (P) according to the present invention is a two-steps method, which is easy to perform and convenient on industrial scale.

Also, the method according to the present invention allows preparing polymers having different structures, depending on the conditions of the method and on the molar ratio of the reagents, as explained below.

In the method according to the present invention, step (a) proceeds via nucleophilic aromatic substitution of compound (A) by PFPE-alcohol. In order to allow the reaction to occur, step (a) is performed by treating the PFPE-alcohol with a base, in order to obtain the corresponding charged nucleophile group (i.e., the alcoholate group).

Preferably, said base is selected from a carbonate, a tert-butylate or a hydroxide. More preferably, said base is selected from $Na_2CO_3$ and $K_2CO_3$, K ter-butylate, NaOH and KOH. Even more preferably, said base is KOH.

Preferably, said PFPE-alcohol comprises at least one (per)fluoropolyether chain [chain ($R_{pf}$)] having two chain ends [end ($R_e$)], wherein said two ends ($R_e$) bear a neutral group as defined above or comprises —OH, provided that at least one of said two ends ($R_e$) comprises —OH.

More preferably, both said chain ends ($R_e$) comprise —OH.

Said chain ($R_{pf}$) is as defined above. In a preferred embodiment, said chain ($R_{pf}$) comprises chain ($R_f$) complying with formula ($R_f$-III) as defined above.

When only one of said ends ($R_e$) comprises —OH and the other end ($R_e$) bears a neutral group as defined above, the PFPE-alcohol is a monofunctional PFPE-alcohol.

When both said ends ($R_e$) comprise —OH, the PFPE-alcohol is a bifunctional PFPE-alcohol. Preferably, the functionality of the bifunctional PFPE-alcohol, i.e. the number of —OH groups, is at least equal to 1.80, more preferably at least equal to 1.85 and still more preferably at least equal to 1.94.

Monofunctional and bifunctional PFPE alcohols are commercially available from Solvay Specialty Polymers (Italy). For example, said monofunctional PFPE-alcohol can be obtained according to the method disclosed in EP 1810987 (SOLVAY SOLEXIS S.P.A.) and said bifunctional PFPE-alcohol can be obtained according to the method disclosed in EP 1614703 A (SOLVAY SOLEXIS S.P.A.).

More preferably, said ends ($R_e$) comprising —OH comply with the following general formulae ($R_e$-I) to ($R_e$-V):

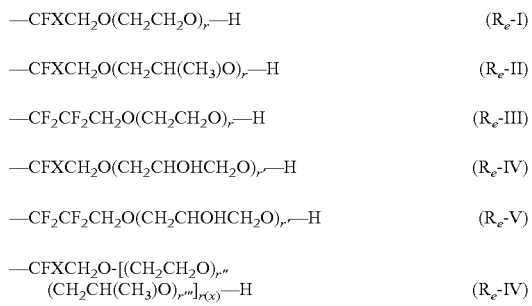

wherein

X is F or —$CF_3$, r, r", r''' and r(x) are, each independently, an integer from 0 to 10, preferably from 0 to 7 and r' is an integer from 1 to 3.

Even more preferably, ends ($R_e$) comply with general formula ($R_e$-I) as defined above, wherein r is 0.

Methods for preparing PFPE alcohols comprising ends ($R_e$) complying with the abovementioned formulae can be prepared, for example, as disclosed in WO 2014/090649 (SOLVAY SPECIALTY POLYMERS ITALY S.P.A.) and in WO 2009/043928 (SOLVAY SOLEXIS S.P.A.).

Preferably, said compound (A) is a 5- to 10-membered aromatic ring substituted with at least two halogen atoms, optionally comprising at least one heteroatom and optionally bounded to or condensed with one or more further aromatic rings.

More preferably, said compound (A) is a 5- to 10-membered aromatic ring substituted with at least three halogen atoms. Even more preferably, said compound (A) is a fully halogenated 5- to 10-membered aromatic ring.

Preferably, said halogen atoms are independently selected from fluorine, chlorine and bromine; more preferably, all halogen atoms are fluorine atoms.

In a preferred embodiment, said compound (A) is selected from hexafluorobenzene (HFB), pentafluoropyridine and perfluorobiphenyl. Still more preferably, said compound (A) is hexafluorobenzene (HFB).

Step (a) can be carried out without solvent or, alternatively, in a totally or partially fluorinated solvent or in an aprotic polar hydrogenated solvent.

When the solvent is used in step (a), said solvent is preferably a partially fluorinated solvent selected from hydrofluoroethers or hexafluoroxylene [1,3-bis-(trifluoromethyl)benzene; herein after "HFX"]. More preferably, said solvent is HFX.

Preferably, step (a) is performed under heating, more preferably at a temperature between 50° C. and 120° C., still more preferably between 70° C. and 100° C.

In the method according to the present invention, step (b) proceeds via nucleophilic aromatic substitution of compound (A) by group (U) of compound (AN).

Preferably, said group (N*) is a primary, secondary or tertiary amino group.

More preferably, said group (N*) is as group (N) defined above.

Group (U) is a nucleophile group, i.e. a group able to act as the nucleophile species in a nucleophilic substitution reaction.

Preferably, said group (U) is a hydroxy group, a thiol group or an amino group. More preferably, said group (U) is a hydroxy group or a thiol group.

When group (U) is a hydroxyl or a thiol group, in order to allow the reaction to occur, step (b) is performed by treating compound (AN) with a base in order to obtain the corresponding charged nucleophile group [group ($U^-$)].

Preferably, said base is selected from carbonates, tert-butylates or hydroxides of alkali metals. More preferably, said base is selected from $Na_2CO_3$ and $K_2CO_3$, NaOH and KOH. Even more preferably, said base is KOH.

Preferably, said at least one group (N*) is bound to said group (U) through an alkylene bridging group ($R^*_H$).

Preferably, said group ($R^*_H$) is an alkylenyl chain comprising from 1 to 12, more preferably from 1 to 8, carbon atoms, wherein said alkylenyl chain is optionally substituted with at least one hydroxy group and/or optionally interrupted by at least one heteroatom selected from O, S and NH; or a 5- or 6-membered aromatic moiety.

More preferably, said group ($R^*_H$) is an alkylenyl chain comprising from 1 to 6, more preferably from 1 to 3, carbon atoms, wherein said alkylenyl chain is optionally interrupted by at least one oxygen atom.

Preferably, compound (AN) complies with the following formula (AN-I):

wherein

U is selected from —OH, —SH and —NHR wherein R is H or ($C_{1-3}$)alkyl;

($R^*_H$) is as defined above; and $R_1$ and $R_2$ are as defined above.

Step (b) can be carried out without solvent or, alternatively, in a totally or partially fluorinated solvent or in an aprotic polar hydrogenated solvent.

When the solvent is used in step (b), said solvent is preferably a partially fluorinated solvent, such as HFX.

Preferably, step (b) is performed under heating, more preferably at a temperature between 50° C. and 150° C., still more preferably between 70° C. and 120° C.

Advantageously, when in the process according to the present invention, step (a) is carried out in the presence of a molar ratio between compound (A) and the PFPE-alcohol of from 4:1 to 10:1, polymer (P) according to the present invention complies with formulae (P-I) and (P-II) as defined above.

Advantageously, when in the process according to the present invention, step (a) is carried out in the presence of a molar ratio between compound (A) and the PFPE-alcohol of from 0.5:1 to 4:1, more preferably from 1:1 to 4:1, polymer (P) according to the present invention complies with formulae (P-III) and (P-IV) as defined above.

Preferably, in step (b), the molar ratio between the compound obtained in step (a) and compound (AN) is from 1:1 to 1:10, more preferably from 1:1 to 1:5 and still more preferably about 1:3.

Uses of Polymer (P)

When group (N) is a primary or secondary amino group, polymer (P) according to the present invention can be used as reactive additive (in other words, as curing agent or hardener) in resins, such as epoxy resins, polyisocyanate resins, anhydrides of carboxylic acids, to impart outstanding surface properties, such as for example water/oil repellency, easy cleanability and stain release.

When used as curing agent, polymer (P) can be optionally used in combination with hydrogenated amino resin(s). In this case, the weight ratio between polymer (P) and said hydrogenated amino resin(s) is 1:99-99:1, preferably 2:98-75:25, more preferably of from 5:95-50:50.

Thus, another object of the present invention relates to the use of polymer (P) wherein group N is a primary or secondary amino group, optionally in combination with hydrogenated amino resin(s), as curing agent in resins, such as epoxy resins, polyisocyanate resins, anhydrides of carboxylic acids.

In still another object, the present invention relates to a composition comprising polymer (P) wherein group (N) is a primary or secondary amino group; at least one resin selected from epoxy resin, polyisocyanate resin and anhydrides of carboxylic acids; and optionally further ingredients.

Preferably, said composition is a liquid composition.

Preferably, said composition comprises an amount of said polymer (P) of from 0.5 to 50 wt. %, more preferably of from 1 to 25 wt. %, even more preferably of from 2 to 15 wt. %.

Preferably, said at least one resin is an epoxy resin, having an epoxy equivalent weight of from about 100 to 4000.

Preferably, said composition comprises an amount of said epoxy resin of from 30 to 85 wt. %, more preferably of from 40 to 75 wt. %, even more preferably of from 45 to 70 wt. % based on the total weight of the composition.

Preferably, said further ingredients are selected from hydrogenated amino resin(s), solvent(s), catalyst(s) and promoter(s).

When the hydrogenated amino resin is present in the composition, the weight ratio between polymer (P) and said hydrogenated amino resin(s) is as defined above.

When present in the abovementioned composition, said solvent is miscible with both polymer (P) and the at least one resin.

When said resin is an epoxy resin, suitable solvents are for example glycol ethers, such as ethylene or propylene glycol monomethylether, and esters thereof, such as ethylene glycol monoethylether acetate; ketones, such as methyl-isobutyl-ketone, methyl-ethyl-ketone and acetone; aromatic hydrocarbons, such as toluene, xylene and mixtures thereof.

Preferably, said composition comprises an amount of said solvent of from 5 to 300 wt. % based on the total weight of the other components of the composition.

The composition as defined above can be cross-linked, for example working in a temperature range of from about 40° C. to about 200° C., preferably from 60° C. to 150° C., in order to provide a cross-linked article.

Preferably, said article is in the form of a film.

The cross-linked article thus obtained shows surface properties, such as for example water/oil repellency, easy cleanability and stain release.

Also, when group (N) is a primary or secondary amino group, polymer (P) according to the present invention can be used as building block in the synthesis of further polymers, such as for example polyamides.

On the other hand, when group (N) is a tertiary amino group, polymer (P) according to the present invention can be used as intermediate compound in the synthesis of PFPE polymers comprising quaternary ammonium cation(s) or zwitterionic group(s).

Thus, another object of the present invention relates to the use of polymer (P), wherein group N is a tertiary amino group, in the synthesis of PFPE polymers comprising quaternary ammonium cation(s) or zwitterionic group(s).

Still another object of the present invention relates to a polymer [polymer (P-D)] comprising:
at least one aromatic moiety [moiety (A)] optionally substituted with at least one halogen atom,
at least one (per)fluoropolyether chain [chain ($R_{pf}$)] linked to said moiety (A), and
at least one quaternary ammonium cation linked to said moiety (A) or at least one zwitterionic group linked to said moiety (A).

Said moiety (A) and said chain ($R_{pf}$) are as disclosed above with respect to polymer (P) and are preferably linked each other through group (B), which is as defined above.

Preferably, said quaternary ammonium cation or said zwitterionic group is linked to said moiety (A) through group ($R_H$), which is as defined above with respect to polymer (P).

Polymer (P-D1) comprising at least one quaternary ammonium cation can be obtained by reacting polymer (P) according to the present invention, wherein group (N) is a tertiary amino group, with an alkylating compound, for example alkyl halides, wherein the alkyl group has 1 to 6 preferably 1 to 3 carbon atoms, and the halide is chloride, bromide, preferably chloride.

The skilled person can determine suitable conditions for preparing polymer (P-D1) as defined above, depending on the starting polymer and the alkylating compound used.

Preferably, said quaternary ammonium cation complies with the following formula (N-II):

$$-N^+(R_1)(R_2)(R_3)Y^- \qquad \text{(N-II)}$$

wherein $R_1$ and $R_2$, identical or different each other are a linear or branched saturated or unsaturated alkyl chain having from 1 to 10 carbon atoms, or a 3- to 6-membered saturated or unsaturated ring optionally comprising at least one heteroatom, $R_3$ is a linear or branched alkyl chain having from 1 to 10 carbon atoms; and $Y^-$ is an anion, preferably chloride, bromide or hydroxide.

Polymer (P-D2) comprising at least one zwitterionic group can be obtained by reacting polymer (P) according to the present invention, wherein group (N) is a tertiary amino group, with an alkylating compound comprising an anionic group, such as carboxylate, sulphonate and phosphate.

Good results have been obtained by reacting polymer (P) with sodium chloroacetate as an alkylating compound.

The skilled person can determine suitable conditions for preparing polymer (P-D2) as defined above, depending on the starting polymer and the alkylating compound used.

Preferably, said zwitterionic group comprises an ammonium group and an anionic group selected from carboxylate, sulphonate and phosphate.

More preferably, said zwitterionic group complies with the following formula (Z-I):

$$—N^+(R_1)(R_2)(Z_1) \qquad (Z\text{-}I)$$

wherein $R_1$ and $R_2$, identical or different each other are a linear or branched saturated or unsaturated alkyl chain having from 1 to 10 carbon atoms, or a 3- to 6-membered saturated or unsaturated ring optionally comprising at least one heteroatom, and $Z_1$ is a linear or branched alkyl chain having from 1 to 6, preferably from 1 to 3, carbon atoms and being substituted with at least one carboxylate, sulphonate or phosphate group.

Advantageously, when polymer (P-D2) comprising at least one zwitterionic group is placed in water solutions/compositions, chain ($R_f$) separates from the aqueous phase, while the zwitterionic group interact with it. Therefore, when polymers (P-D2) are used as coatings on surfaces on materials in contact with aqueous compositions or solutions, the zwitterionic group tends to migrate to the surface towards the aqueous phase, while chain ($R_f$) remains in contact with the coated surface.

For this reason, polymers (P-D2) can be used as additives in compositions for coating substrates that are in contact with aqueous compositions or solutions, to avoid penetration of said aqueous compositions or solutions in said substrates.

Should the disclosure of any patents, patent applications and publications which are incorporated herein by reference conflict with the description of the present application to the extent that it may render a term unclear, the present description shall take precedence.

The invention will be herein after illustrated in greater detail by means of the Examples contained in the following Experimental Section; the Examples are merely illustrative and are by no means to be interpreted as limiting the scope of the invention.

EXPERIMENTAL SECTION

Materials and methods
PFPE-diol was obtained by Solvay Specialty Polymers Italy S.p.A.
Hexafluorobenzene (HFB) was obtained by Sigma-Aldrich Corp.
Hexafluoroxylene (HFX) was obtained by Miteni S.p.A.
Potassium hydroxide (KOH) was obtained by Sigma-Aldrich Corp.
Ethanolamine was obtained by Sigma-Aldrich Corp.
Isobutanol was obtained by Sigma-Aldrich Corp.
$^{19}$F-NMR and $^1$H-NMR spectra were recorded on an Agilent System 500 operating at 499.86 MHz for $^1$H and 470.30 MHz for $^{19}$F.

EXAMPLE 1

Synthesis of Polymer (P) Complying with Formula (P-II)

Step (a)
150 g of PFPE-diol of formula $HOCH_2CF_2O(CF_2CF_2O)_{a1}(CF_2O)_{a2}CF_2CH_2OH$
(EW=1006 g/eq; 149 meq of —OH), 76 g of hexafluorobenzene (HFB) (MW=186; 408 mmol) and 150 g of hexafluoroxylene (HFX) as solvent were charged in a four necked round bottom flask equipped with mechanical stirrer, condenser and thermometer, under nitrogen flow.

Under vigorous stirring at room temperature, 11.8 g of potassium hydroxide (KOH) (85%, powder) were charged in the reactor. The reaction mixture was then heated at 80° C. and kept at this temperature until complete conversion of the alcohol chain ends, monitoring by $^{19}$F-NMR (—OCF$_2$CH$_2$OH chemical shift (reference: CFCl$_3$)=−81.5 ppm, −83.5 ppm).

The reaction mixture was then cooled at room temperature and washed with 200 g of water. The organic layer was separated and the excess of HFB and of HFX solvent was recovered by distillation.

168 g of PFPE intermediate were obtained and characterized by $^{19}$F-NMR and $^1$H-NMR.

The analysis confirmed the following structure:

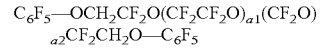

with average equivalent weight=1172 and the ratio a1/a2=1.0.
Analysis.
$^{19}$F-NMR: —OCF$_2$CH$_2$OAr −79 ppm; −81 ppm
$^1$H-NMR: —OCF$_2$CH$_2$OAr 4.6 ppm
IR: 1506 cm$^{-1}$ (fluoroaromatic ring)

Step (b)
A four necked round bottom flask equipped with mechanical stirrer, condenser and thermometer, was charged under nitrogen flow with 31 g of ethanolamine (MW=61; 508 mmol), 70 g of HFX and 70 g of the PFPE intermediate (EW=1172 g/eq; 60 meq) prepared according to step (a) disclosed above.

Under vigorous stirring at room temperature, 7.9 g of potassium hydroxide (KOH) powder (85%, 120 mmol) were added to the reaction mixture, which was then heated at 80° C. and kept at this temperature for 6 hours. Additional 2 g of KOH powder (85%) were added and the reaction mixture was reacted for further 2 hours in order to complete the reaction.

The reaction mixture was then cooled at room temperature and washed with a mixture water/isobutanol (100 g+30 g, respectively). The organic layer was separated, washed again with 65 g of the same water/isobutanol mixture and then the solvent HFX was distilled under vacuum at 80° C.

68 g of final product PFPE-amine were obtained, having the following structure:

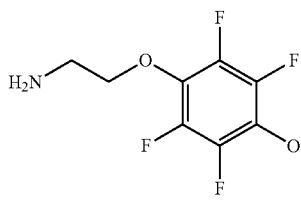
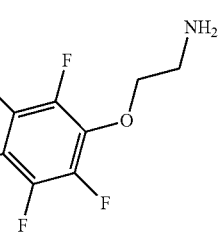

Analysis.

The mono-substitution of the aromatic moiety ($-C_6F_5-$) by the aminoethanol group was confirmed as follows:

$^{19}$F-NMR analysis showed signals in the region 150-160 ppm;

$^{1}$H-NMR analysis showed signals of PFPE-$CF_2CH_2O-$Ar and Ar$-OCH_2CH_2NH_2$ (c.s.=4.6 and 4.1 ppm, respectively) in a 1:1 ratio;

potentiometric titration with HCl gives an equivalent weight of the $-NH_2$ groups equal to 1300.

EXAMPLE 2

Synthesis of Polymer (P) Complying with Formula (P-II)

A four necked round bottom flask equipped with mechanical stirrer, condenser and thermometer, was charged under nitrogen flow with 20 g of 2-aminoethoxyethanol (MW=105; 186 mmol), 25 g of HFX and 25 g of the PFPE intermediate (EW=1172 g/eq; 60 meq) prepared according to step (a) of Example 1 disclosed above.

Then, the procedure described in Example 1, step (b) was followed and 20.6 g of final product PFPE-amine were obtained and characterized by $^{19}$F-NMR and $^{1}$H-NMR, which confirm the following structure:

$H_2N-CH_2CH_2OCH_2C\ H_2O-C_6F_5-OCH_2CF_2O$
$(CF_2CF_2O)_{a1}(CF_2O)_{a2}CF_2CH_2O-C_6F_5-$
$OCH_2CH_2OCH_2CH_2-NH_2$

EXAMPLE 3

Synthesis of Polymer (P) Complying with Formula (P-IV)

Step (a)

20 g of PFPE-diol of formula

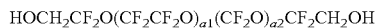

(EW=515 g/eq; 38.8 meq of $-OH$), 3.63 g of hexafluorobenzene (MW=186; 19.9 mmoli) and 20 g of hexafluoroxylene (HFX) as solvent were charged in a four necked round bottom flask equipped with mechanical stirrer, condenser and thermometer, under nitrogen flow.

The procedure disclosed in Example 1, step (a) was followed by adding 3.1 g of potassium hydroxide (85%, powder; 47 mmoles), heating the reaction mixture at 80° C. for 2 hours and then cooling down at room temperature.

6.0 g of hexafluorobenzene were then added and the temperature was raised again at 80° C. and maintained under stirring until complete conversion of the alcohol chain ends.

The reaction mixture was then cooled at room temperature and washed with 41 g of water. The organic layer was separated and the excess of hexafluorobenzene and HFX solvent were recovered by distillation.

22.4 g of PFPE derivative were obtained and characterized by $^{19}$F-NMR and $^{1}$H-NMR. The analysis confirmed the following structure, having average molecular weight=2720 and a1/a2=1.0:

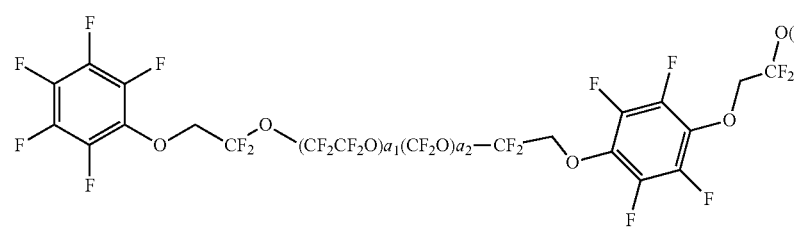
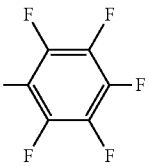

Step (b)

A four necked round bottom flask equipped with mechanical stirrer, condenser and thermometer, was charged under nitrogen flow with 8.0 g of ethanolamine (MW=61; 131 mmoli), 20 g of HFX and 20 g of the PFPE intermediate (MW=2720 g/eq; 7.36 mmoles) prepared according to step (a) of Example 3 disclosed above.

Then, the procedure described in Example 1, step (b) was followed and 19.9 g of final product PFPE-amine were obtained and characterized by $^{19}$F-NMR, $^{1}$H-NMR and potentiometric titration, which confirmed the following structure:

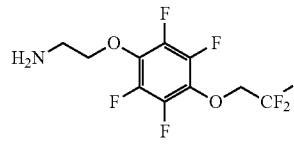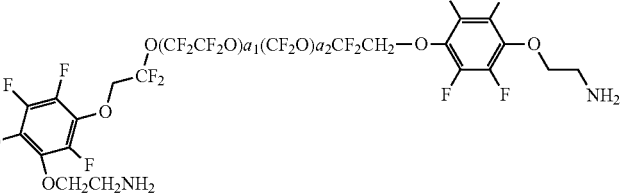

EXAMPLE 4

Synthesis of Polymer (P) Complying with Formula (P-IV)

A four necked round bottom flask equipped with mechanical stirrer, condenser and thermometer, was charged under nitrogen flow with 12.0 g of 2-(dimethylamino)ethanol (MW=89; 135 mmol), 20 g of HFX and 20 g of the PFPE intermediate (EW=2720 g/eq; 7.36 mmol) prepared according to step (a) of Example 3 disclosed above.

Then, the procedure described in Example 3, step (b) was followed and 19.8 g of final product PFPE-amine were obtained and characterized by $^{19}$F-NMR, $^{1}$H-NMR and potentiometric titration, which confirm the following structure:

The temperature was raised up to 80° C. and the reaction was let under stirring for 8 hours. After cooling at room temperature, 20 g of HFX, 20 ml of water and 10 g of isobutyl alcohol were added into the reaction mixture, until separation of the organic phase and of the aqueous phase observed. The lower organic phase was recovered and the solvents were evaporated under vacuum, leaving as residue 19.2 g of product.

The characterization by $^{1}$H-NMR and $^{19}$F-NMR confirmed the following structure:

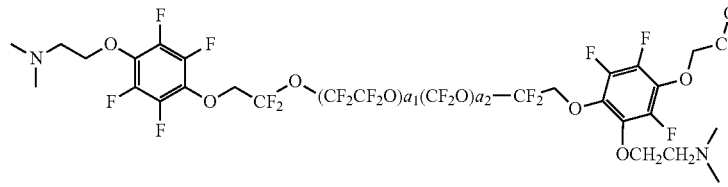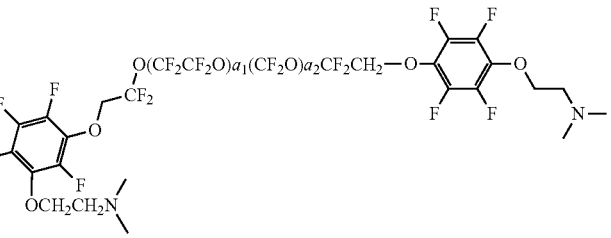

EXAMPLE 5

Synthesis of Polymer (P-D2) Comprising a Zwitterionic Group

A four necked round bottom flask equipped with mechanical stirrer, condenser and thermometer, was charged with 18.6 g of the PFPE-amino polymer obtained according to the procedure disclosed in Example 4 (MW=2925; 6.36 mmoles), 2.3 g of sodium chloroacetate (MW=116; 20 mmoles), 20 g of ethanol and 1.0 ml of water.

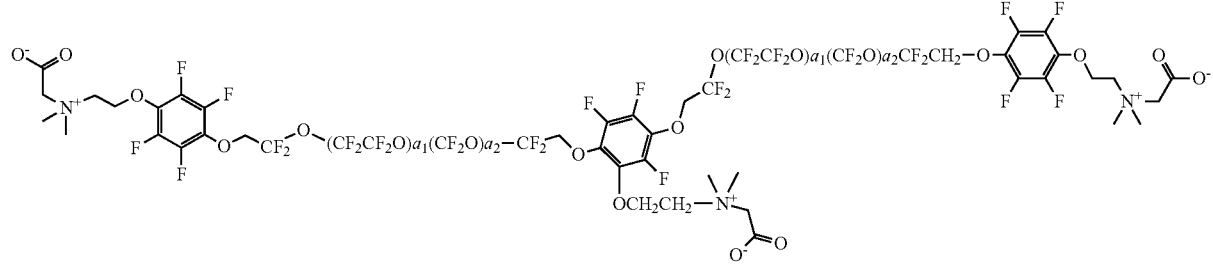

The invention claimed is:

1. A polymer (P) comprising:
   at least one aromatic moiety (A) optionally substituted with at least one halogen atom, at least one (per)fluoropolyether chain ($R_{pf}$) linked to moiety (A), and at least one amino group (N) linked to moiety (A) through an alkylenyl bridging group ($R_H$) comprising from 1 to 12 carbon atoms and at least one heteroatom directly bonded to moiety (A).

2. The polymer (P) according to claim 1, wherein said moiety (A) is a 5- to 10-membered aromatic ring, optionally comprising at least one heteroatom and/or optionally being bounded to or condensed with one or more further aromatic rings.

3. The polymer (P) according to claim 1, wherein chain ($R_{pf}$) is of formula —O—$R_f$—, wherein $R_f$ is a fully or partially fluorinated polyoxyalkylene chain ($R_f$) that comprises repeating units $R°$, said repeating units being independently selected from the group consisting of:

(I) —CFXO—, wherein X is F or $CF_3$;

(ii) —CFXCFXO—, wherein X, equal or different at each occurrence, is F or $CF_3$, with the proviso that at least one of X is —F;

(iii) —$CF_2CF_2CW_2O$—, wherein each of W, equal or different from each other, are F, Cl, H;

(iv) —$CF_2CF_2CF_2CF_2O$—;

(v) —$(CF_2)_j$—CFZ—O— wherein j is an integer from 0 to 3 and Z is a group of general formula —O—$R_{(f-a)}$-T, wherein $R_{(f-a)}$ is a fluoropolyoxyalkene chain comprising a number of repeating units from 0 to 10, said recurring units being selected from: —CFXO—, —$CF_2CFXO$—, —$CF_2CF_2CF_2O$—, and —$CF_2CF_2CF_2CF_2O$—, with each X being independently F or $CF_3$ and T being a $C_1$-$C_3$ perfluoroalkyl group.

4. The polymer (P) according to claim 1, wherein group (N) is a primary, secondary or tertiary amino group.

5. The polymer (P) according to claim 3, wherein chain ($R_f$) is linked to moiety (A) through an alkylenyl chain (B) comprising from 1 to 20 carbon atoms and at least one heteroatom directly bonded to moiety (A).

6. A method for manufacturing polymer (P), the method comprising:

(a) reacting at least one (per)fluoropolyether-alcohol [PFPE-alcohol] with an aromatic compound (A) substituted with at least two halogen atoms, and (b) reacting the compound obtained in step (a) with a compound (AN) comprising at least one amino group (N*) and at least one nucleophilic group (U).

7. The method according to claim 6, wherein said step (a) is performed by treating said PFPE-alcohol with a base.

8. The method according to claim 6, wherein said PFPE-alcohol comprises at least one (per)fluoropolyether chain ($R_{pf}$) having two chain ends ($R_e$) wherein said two ends ($R_e$) comprise —OH or bear a neutral group selected from —$CF_2H$, —$CF_2CF_2H$, —$CF_3$, —$CF_2CF_3$, —$CF_2Cl$, —$CF_2CF_2Cl$, —$C_3F_6Cl$ and —$CF_2Br$, provided that at least one of said two ends ($R_e$) comprises —OH.

9. The method according to claim 6, wherein group (U) is selected from —OH and —SH and step (b) is performed by treating said compound (AN) with a base.

10. The method according to claim 7, wherein said base is selected from carbonates, tert-butylates and hydroxides of alkali metals.

11. A curing agent in a resin comprising a polymer (P) according to claim 1, wherein said group (N) is a primary or secondary amino group.

12. A composition comprising polymer (P) as defined in claim 1, wherein group (N) is a primary or secondary amino group; at least one resin selected from epoxy resin, polyisocyanate resin and anhydrides of carboxylic acids; and optional further ingredients.

13. The composition according to claim 12, wherein said further ingredients are selected from hydrogenated amino resin(s), solvent(s), catalyst(s) and promoter(s).

14. A polymer (P-D) comprising:

at least one aromatic moiety (A) optionally substituted with at least one halogen atom, at least one (per)fluoropolyether chain ($R_{pf}$) linked to moiety (A), and at least one quaternary ammonium cation linked to moiety (A) or at least one zwitterionic group linked to moiety (A).

15. The method according to claim 9, wherein said base is selected from carbonates, tert-butylates and hydroxides of alkali metals.

* * * * *